United States Patent
Yang et al.

(10) Patent No.: US 11,696,039 B2
(45) Date of Patent: Jul. 4, 2023

(54) SMART IP CAMERA WITH COLOR NIGHT MODE

(71) Applicant: Ambarella International LP, Santa Clara, CA (US)

(72) Inventors: Zhikan Yang, Shanghai (CN); Yutao Feng, Shanghai (CN)

(73) Assignee: Ambarella International LP, Santa Clara, CA (US)

(*) Notice: Subject to any disclaimer, the term of this patent is extended or adjusted under 35 U.S.C. 154(b) by 5 days.

(21) Appl. No.: 17/034,095

(22) Filed: Sep. 28, 2020

(65) Prior Publication Data
US 2022/0094847 A1     Mar. 24, 2022

(30) Foreign Application Priority Data
Sep. 21, 2020   (CN) .......................... 202010997403.3

(51) Int. Cl.
| | |
|---|---|
| *H04N 25/131* | (2023.01) |
| *H04N 23/80* | (2023.01) |
| *G06F 16/783* | (2019.01) |
| *H04N 5/265* | (2006.01) |
| *H04N 7/18* | (2006.01) |
| *G06T 7/11* | (2017.01) |
| *H04N 9/64* | (2023.01) |
| *G06F 16/71* | (2019.01) |
| *G06V 20/52* | (2022.01) |
| *G06F 18/211* | (2023.01) |
| *H04N 23/10* | (2023.01) |
| *H04N 23/45* | (2023.01) |

(52) U.S. Cl.
CPC ............. *H04N 23/80* (2023.01); *G06F 16/71* (2019.01); *G06F 16/785* (2019.01); *G06F 18/211* (2023.01); *G06T 7/11* (2017.01); *G06V 20/52* (2022.01); *H04N 5/265* (2013.01); *H04N 7/183* (2013.01); *H04N 9/646* (2013.01); *H04N 23/10* (2023.01); *H04N 23/45* (2023.01); *G06T 2207/10024* (2013.01); *G06T 2207/10048* (2013.01); *G06T 2207/20084* (2013.01); *G06T 2207/30232* (2013.01)

(58) Field of Classification Search
CPC ........ H04N 5/265; H04N 9/045; H04N 7/183; H04N 5/23229; H04N 9/646; H04N 5/2258; G06T 2207/20084; G06T 2207/30232; G06T 2207/10048; G06T 7/11; G06T 2207/10024; G06F 16/785; G06F 16/71; G06K 9/00771; G06K 9/6228
See application file for complete search history.

(56) References Cited

U.S. PATENT DOCUMENTS

| | | | | |
|---|---|---|---|---|
| 3,909,266 | A | * | 9/1975 | Inoue ....................... G03C 1/73 430/335 |
| 4,245,239 | A | * | 1/1981 | Richman ................ H04N 11/00 348/628 |

(Continued)

*Primary Examiner* — Philip P. Dang
(74) *Attorney, Agent, or Firm* — Christopher P. Maiorana, PC

(57) ABSTRACT

An apparatus includes a camera and a processor circuit. The camera may be configured to capture color images in response to visible light and monochrome infrared images in response to infrared light. The processor circuit may be configured to extract color features from the color images and add color to corresponding monochrome features detected in the monochrome infrared images.

20 Claims, 9 Drawing Sheets

(56) References Cited

U.S. PATENT DOCUMENTS

| | | | | |
|---|---|---|---|---|
| 7,965,336 B2* | 6/2011 | Bingle | ............... | G03B 17/02 348/149 |
| 8,438,978 B2* | 5/2013 | Sullivan | ............... | F42B 12/48 102/513 |
| 8,659,653 B2* | 2/2014 | Joly | ............... | G01B 11/24 348/42 |
| 8,706,184 B2* | 4/2014 | Mohr | ............... | A61B 1/000094 600/407 |
| 8,749,635 B2* | 6/2014 | Hogasten | ............... | H04N 23/11 348/177 |
| 9,055,237 B1* | 6/2015 | Chang | ............... | H04N 9/31 |
| 9,354,490 B2* | 5/2016 | Fergus | ............... | H04N 23/74 |
| 9,451,183 B2* | 9/2016 | Hbgasten | ............... | H04N 5/33 |
| 9,635,285 B2* | 4/2017 | Teich | ............... | G06T 5/003 |
| 10,223,588 B2* | 3/2019 | Wilson | ............... | G06V 20/38 |
| 10,244,190 B2* | 3/2019 | Boulanger | ............... | H04N 23/11 |
| 10,292,369 B1* | 5/2019 | Heath | ............... | A61B 5/0205 |
| 10,360,439 B2* | 7/2019 | Fan | ............... | G06V 40/172 |
| 10,440,293 B1* | 10/2019 | Ihns | ............... | B64D 47/08 |
| 10,596,198 B1* | 3/2020 | Betts-Lacroix | ............... | A61B 5/165 |
| 10,646,288 B2* | 5/2020 | Yeung | ............... | A61B 5/065 |
| 10,692,245 B2* | 6/2020 | Xu | ............... | G06T 7/90 |
| 10,803,590 B2* | 10/2020 | Oh | ............... | G06T 7/11 |
| 10,825,158 B2* | 11/2020 | Tanaka | ............... | G06T 7/20 |
| 10,839,510 B2* | 11/2020 | Mahoor | ............... | G06V 10/52 |
| 10,959,398 B1* | 3/2021 | Betts-Lacroix | ............... | G06V 10/143 |
| 11,033,494 B1* | 6/2021 | Betts-Lacroix | ............... | A61K 9/0087 |
| 11,055,857 B2* | 7/2021 | Zhang | ............... | G06N 3/04 |
| 11,100,369 B2* | 8/2021 | Li | ............... | G06F 18/214 |
| 11,102,462 B2* | 8/2021 | Abou Shousha | ............... | A61B 3/145 |
| 11,107,257 B1* | 8/2021 | Diverdi | ............... | G06F 18/23213 |
| 2007/0201738 A1* | 8/2007 | Toda | ............... | H04N 5/33 382/144 |
| 2015/0186039 A1* | 7/2015 | Ide | ............... | G06F 3/0488 345/168 |
| 2017/0091550 A1* | 3/2017 | Feng | ............... | G06T 3/4061 |
| 2019/0258885 A1* | 8/2019 | Piette | ............... | G06V 10/764 |
| 2020/0029016 A1* | 1/2020 | Tanaka | ............... | H04N 7/188 |
| 2020/0367853 A1* | 11/2020 | Yoo | ............... | G16H 70/20 |
| 2020/0410274 A1* | 12/2020 | Satoh | ............... | G08G 1/16 |
| 2021/0118111 A1* | 4/2021 | Ti | ............... | G06T 5/50 |

* cited by examiner

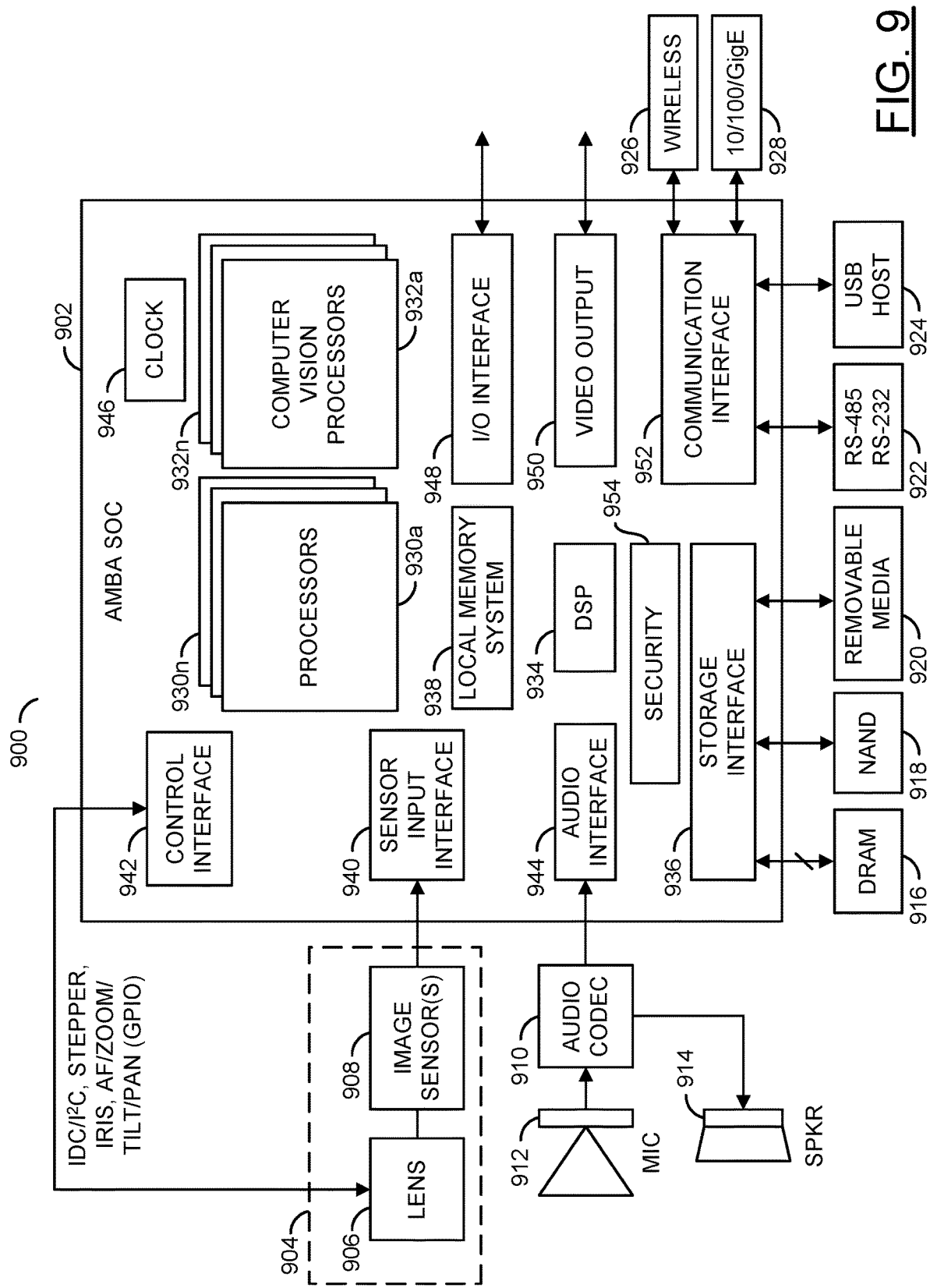

SMART IP CAMERA WITH COLOR NIGHT MODE

This application relates to Chinese Application No. 202010997403.3, filed Sep. 21, 2020, which is incorporated by reference in its entirety.

FIELD OF THE INVENTION

The invention relates to digital IP cameras generally and, more particularly, to a method and/or apparatus for implementing a smart IP camera with a color night mode.

BACKGROUND

A fixed mount surveillance camera looks at a fixed scene and may keep running 24×7 for months. Typically, a fixed mount camera can implement day and night modes. For a fixed mount camera at night, chrominance (color) information is significantly lost and usually only luminance (intensity) information can be received. During night mode operation, infrared (IR) illumination is generally used, and only monochrome (grey scale) video is recorded. Full color video is only available in the day mode. There is significant demand to restore a black-white style night image to a full color style day image.

It would be desirable to implement a smart IP camera with a color night mode.

SUMMARY

The invention encompasses an aspect concerning an apparatus comprising a camera and a processor circuit. The camera may be configured to capture color images in response to visible light and monochrome infrared (IR) images in response to infrared light. The processor circuit may be configured to extract color features from the color images and add color to corresponding monochrome features detected in the monochrome infrared images.

In some embodiments of the apparatus aspect described above, the camera comprises an RGB image sensor and an IR image sensor.

In some embodiments of the apparatus aspect described above, the camera comprises an RGB-IR image sensor.

In some embodiments of the apparatus aspect described above, the camera is mounted in a fixed position.

In some embodiments of the apparatus aspect described above, the processor is configured to store color features extracted from the color images in a database. In some embodiments storing the color features in the database, the processor is further configured to dynamically adjust one or more stored color features stored in the database to adapt to a position of the camera changing. In some embodiments storing the color features in the database, the processor is further configured to dynamically adjust one or more objects stored in the database to adapt to an object in view of the camera changing. In some embodiments storing the color features in the database, the database is stored locally in a memory connected to the processor. In some embodiments storing the color features in the database, the database is stored remotely in a cloud resource.

In some embodiments of the apparatus aspect described above, the camera and the processor are part of at least one of a surveillance system, a security system, and an access control system.

The invention also encompasses an aspect concerning a method for implementing a color night mode in a smart IP camera comprising (i) capturing color images in response to visible light using a camera, (ii) capturing monochrome infrared images in response to infrared light using the camera, (iii) extracting color features from the color images using a processor circuit, and (iv) adding color from the color features to corresponding monochrome features detected in the monochrome infrared images using the processor circuit.

In some embodiments of the method aspect described above, the method further comprises storing the color features extracted from the color images in a database. In some embodiments storing the color features in a database, the method further comprises dynamically adjusting one or more color features stored in the database to adapt to a mounting position of the camera changing.

In some embodiments of the method aspect described above, the method further comprises capturing the color images using an RGB image sensor and capturing the monochrome infrared images using an IR image sensor.

In some embodiments of the method aspect described above, the method further comprises capturing the color images and the monochrome infrared images using an RGB-IR image sensor.

In some embodiments of the method aspect described above, extracting color features from the color images comprises using the processor circuit to apply a segmentation neural network model to the captured color and monochrome infrared images.

In some embodiments of the method aspect described above, extracting color features from the color images further comprises using the processor circuit to apply an object detection neural network model to the captured color and monochrome infrared images to select one or more regions of interest.

In some embodiments of the method aspect described above, adding color from the color features to corresponding monochrome features detected in the monochrome infrared images comprises using the processor circuit to apply a fully convolutional neural network model to the captured monochrome infrared images.

BRIEF DESCRIPTION OF THE FIGURES

Embodiments of the invention will be apparent from the following detailed description and the appended claims and drawings.

FIG. 9 is a diagram of a camera system 900 illustrating an example implementation of a computer vision system in which a true random number generator circuit in accordance with example embodiments of the invention may be utilized.

DETAILED DESCRIPTION OF THE EMBODIMENTS

Embodiments of the present invention include providing a smart IP camera with color night mode that may (i) extract color information for one or more color features extracted from color (RGB) images of a scene captured in a day mode of a smart IP camera, (ii) extract features from monochrome infrared images of the scene captured in a night mode of the smart IP camera, (iii) add color from the one or more color features to corresponding features extracted from the monochrome infrared (IR) images, (iv) store the color information associated with the one or more color features in a database, (v) dynamically adjust the color information and associated color features in the database when the smart IP camera is moved, (vi) utilize separate RGB and IR image sensors to capture the color images and the monochrome infrared images, (vii) utilize an RGB-IR sensor to capture both the color images and the monochrome infrared images, and/or (viii) be implemented as one or more integrated circuits.

In various embodiments, a smart IP camera with a color night mode is provided. Since a fixed mount camera (e.g., surveillance/security camera, etc.) looks at a fixed scene and may keep running 24×7 for months, the fixed mount camera may obtain a large amount of information about the scene. Using computer vision (CV) techniques (e.g., image segmentation, object detection and classification, foreground/background separation, etc.) on both day (color) images and night (monochrome) images, color information regarding fixed objects and backgrounds may be captured from the color day images and the fixed objects and backgrounds may be matched between the day images and the night images. Since the fixed objects and backgrounds may be matched, a process may be implemented to restore accurate full color to the known objects and background in monochrome night mode video using the color information extracted from color day mode video.

In some embodiments, an object of interest (e.g., a person, a car, etc), which may appear and disappear during the day, may also be captured. To detect whether the same object appears in the night mode video, a matching operation may be performed (e.g., using a convolutional neural network (CNN)). In some embodiments, a CNN that is trained with monochrome (or grayscale) images as input, and color images as ground truth, may be applied to generate artificial color on unknown and unmatched objects.

Figure 1:
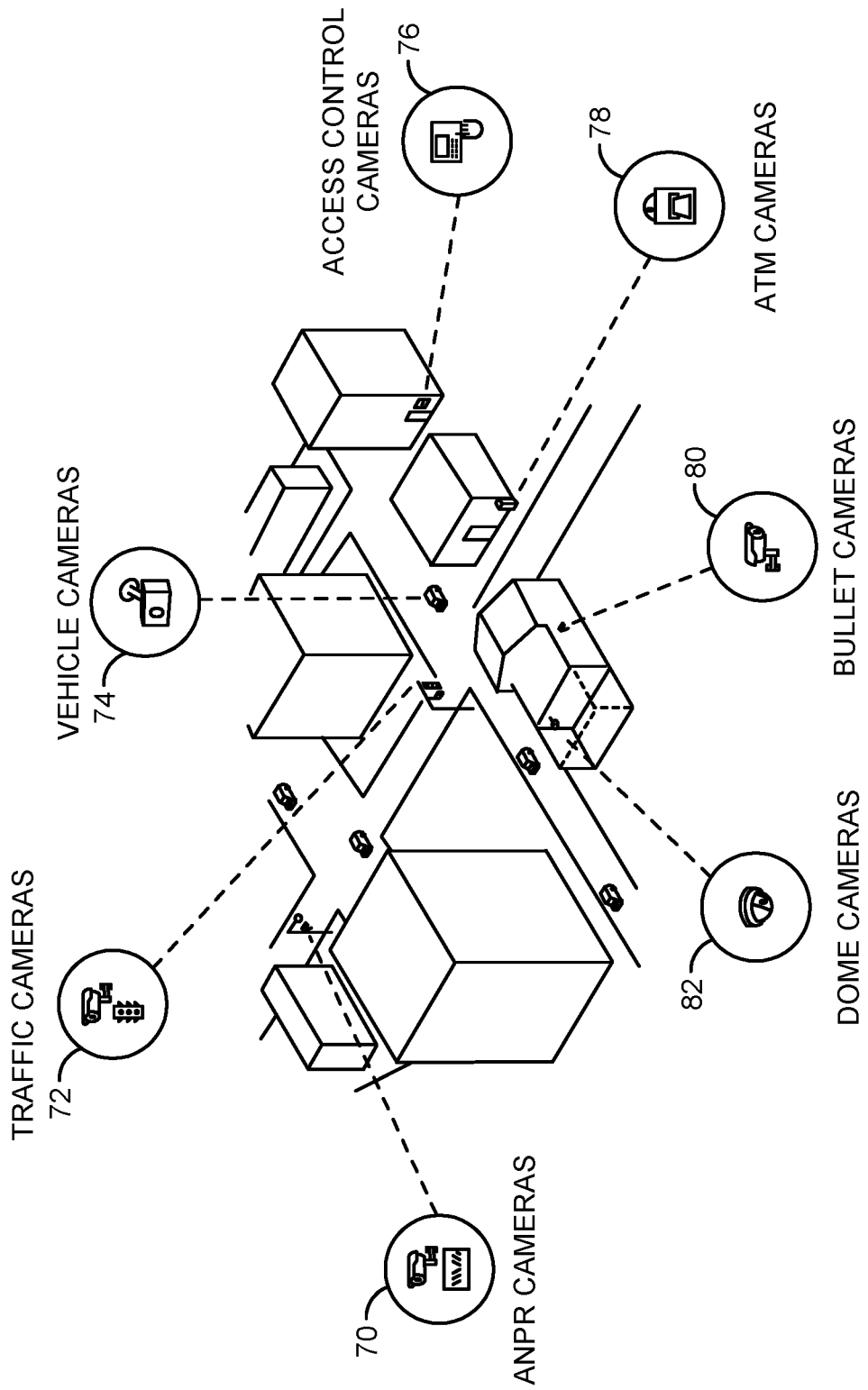
FIG. 1 is a diagram illustrating examples of edge devices that may utilize a smart IP camera with a color night mode in accordance with example embodiments of the invention.

Referring to FIG. 1, a diagram is shown illustrating examples of edge devices that may utilize smart IP cameras with a color night mode in accordance with example embodiments of the invention. In an example, edge devices incorporating smart IP cameras may include low power technology designed to be deployed in embedded platforms at the edge of a network (e.g., microprocessors running on sensors, cameras, or other battery-powered devices), where power consumption is a critical concern. In an example, edge devices incorporating smart IP cameras may comprise traffic cameras and intelligent transportation systems (ITS) solutions including automated number plate recognition (ANPR) cameras 70, traffic cameras 72, vehicle cameras 74, access control cameras 76, automatic teller machine (ATM) cameras 78, bullet cameras 80, and dome cameras 82. In an example, the traffic cameras and intelligent transportation systems (ITS) solutions may be designed to enhance roadway security with a combination of person and vehicle detection, vehicle make/model recognition, and automatic number plate recognition (ANPR) capabilities.

Figure 2:
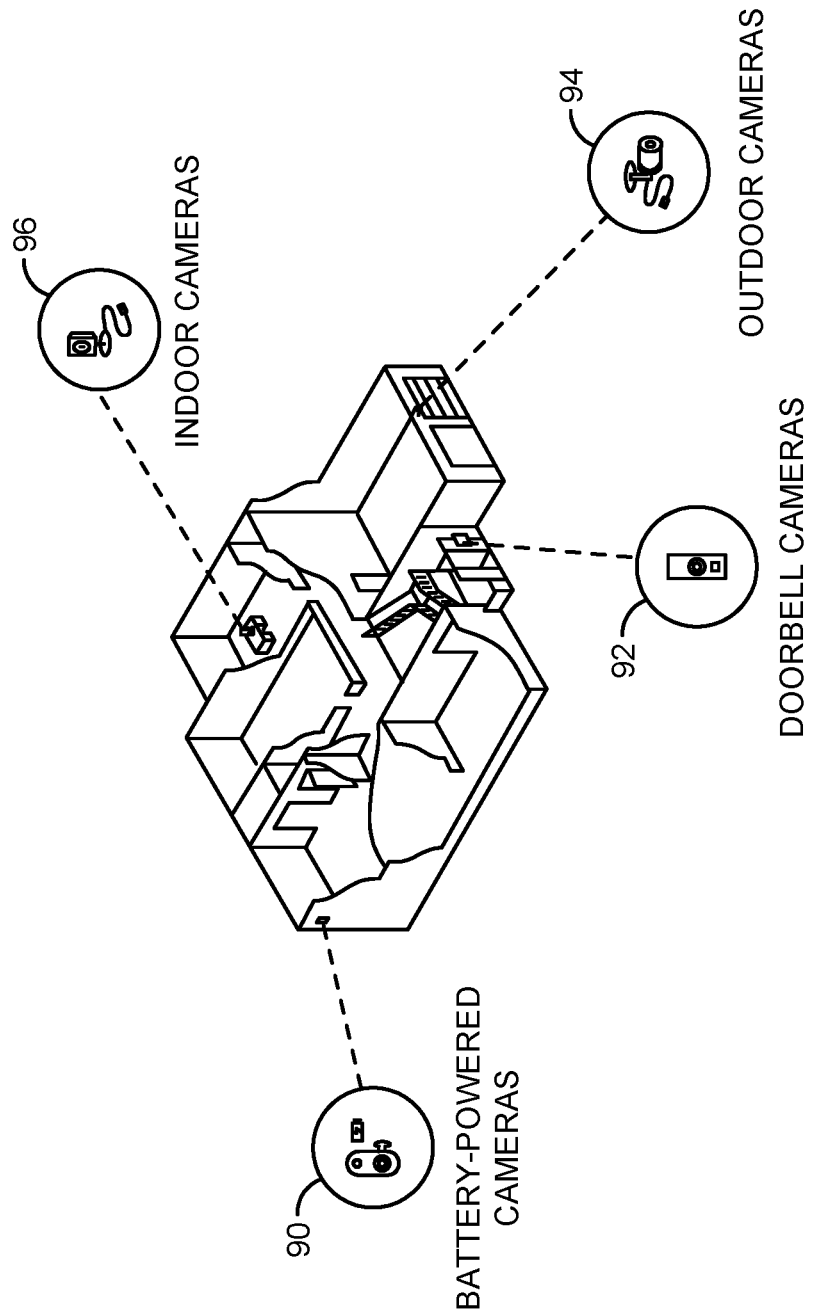
FIG. 2 is a diagram illustrating additional examples of edge devices that may utilize a smart IP camera with a color night mode in accordance with example embodiments of the invention.

Referring to FIG. 2, a diagram is shown illustrating additional examples of edge devices that may utilize a smart IP cameras with a color night mode in accordance with example embodiments of the invention. In an example, edge devices incorporating smart IP cameras with a color night mode may be utilized in security (surveillance) camera and/or access control applications. In an example, the security camera and access control applications may include battery-powered cameras 90, doorbell cameras 92, outdoor cameras 94, and indoor cameras 96. In an example, the security camera and access control application edge devices may include low power technology designed to be deployed in embedded platforms at the edge (e.g., microprocessors/controllers running on battery-powered devices), where power consumption is a critical concern. The security camera and access control applications may realize performance benefits from application of a color night mode in accordance with embodiments of the invention. In an example, an edge device utilizing a color night mode in accordance with an embodiment of the invention may take massive amounts of image data and make on-device inferences to obtain useful information (e.g., restored color images) with reduced bandwidth and/or reduced power consumption.

Figure 3:
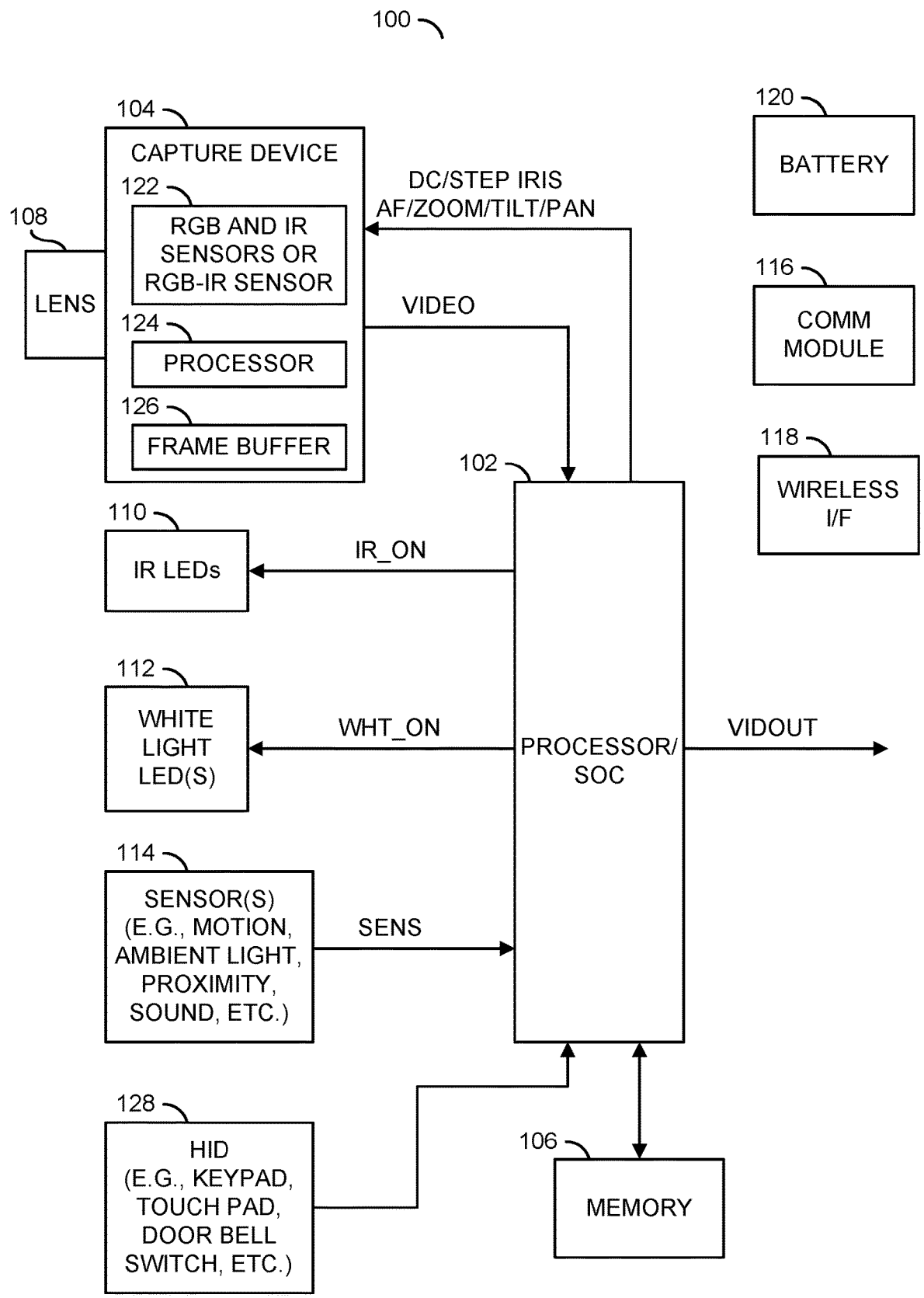
FIG. 3 is a diagram illustrating components of a camera in accordance with example embodiments of the invention.

Referring to FIG. 3, a diagram of a camera 100 is shown illustrating an example implementation of a smart IP camera in accordance with embodiments of the invention. In an example, the camera 100 may comprise a block (or circuit) 102, a block (or circuit) 104, a block (or circuit) 106, a block (or circuit) 108, a block (or circuit) 110, a block (or circuit) 112, a block (or circuit) 114, a block (or circuit) 116, a block (or circuit) 118, and/or a block (or circuit) 120. The circuit 102 may be implemented as a processor circuit or System on Chip (SoC). The circuit 104 may be implemented as a capture device. The circuit 106 may be implemented as a memory. The block 108 may be implemented as a lens or lenses. The circuit 110 may be implemented as one or more infrared (IR) light emitting diodes (LEDs). The circuit 112 may be implemented as one or more visible (e.g., white) light emitting diodes (LEDs). The circuit 114 may be implemented as one or more sensors. The circuit 116 may be implemented as a communication module (or device). The circuit 118 may be implemented as a wireless interface. The circuit 120 may be implemented as a battery.

In some embodiments, the camera 100 may comprise the processor/SoC 102, the capture device 104, the memory 106, the lens(es) 108, the IR LEDs 110, the visible light LEDs 112, the sensors 114, the communication module 116, the wireless interface 118, and the battery 120. In another example, the camera 100 may comprise the capture device 104, the lens(es) 108, the IR LEDs 110, the visible light LEDs 112, and the sensors 114, and the processor/SoC 102, the memory 106, the communication module 116, the wireless interface 118, and the battery 120 may be components of a separate device. The implementation of the camera 100 may be varied according to the design criteria of a particular implementation.

The lens(es) 108 may be attached to the capture device 104. In an example, the capture device 104 may comprise a block (or circuit) 122, a block (or circuit) 124, and a block (or circuit) 126. In one example, the circuit 122 may comprise a color (e.g., RGB) image sensor and a first lens 108, and an infrared (IR) image sensor and a second lens 108. In another example, the circuit 122 may be implemented using an RGB-IR image sensor with a single lens 108. The circuit 124 may be implemented as a processor (e.g. embedded processor, controller, etc.) and/or logic. The circuit 126 may implement a memory circuit (e.g., a frame buffer).

The capture device 104 may be configured to capture video image data (e.g., light collected and focused by the lens(es) 108) of a scene monitored by the camera 100. The capture device 104 may capture data received through the lens(es) 108 to generate a sequence of still pictures and/or a video bitstream (e.g., a sequence of video frames). In various embodiments, the lens(es) 108 may be implemented as a fixed focus lens or lenses. A fixed focus lens generally facilitates smaller size and low power. In an example, a fixed focus lens may be used in battery powered and doorbell camera applications. In some embodiments, the lens(es) 108 may be directed, tilted, panned, zoomed and/or rotated to capture the environment (or scene) surrounding the camera 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor(s) 122 may perform a photoelectric conversion of the light received by the lens(es) 108. The processor 124 may transform the digital data stream into a video data stream (or bitstream), a video file, and/or a number of pictures and/or video frames. In an example, the capture device 104 may present the video data as a digital video signal (e.g., VIDEO). The digital video signal may comprise the video frames (e.g., sequential digital images) and/or audio.

The video data captured by the capture device 104 may be represented as a signal/bitstream/data VIDEO (e.g., a digital video signal). The capture device 104 may present the signal VIDEO to the processor/SoC 102. The signal VIDEO may represent color and/or monochrome infrared video frames/video data. The signal VIDEO may be a video stream captured by the capture device 104.

The image sensor(s) 122 may receive light from the lens(es) 108 and transform the light into digital data (e.g., the bitstream). For example, the image sensor(s) 122 may perform a photoelectric conversion of the light from the lens(es) 108. In some embodiments, the image sensor(s) 122 may have extra margins that are not used as part of the image output. In some embodiments, the image sensor(s) 122 may not have extra margins. In some embodiments, the image sensor(s) 122 may be configured to generate separate RGB and IR video signals. In some embodiments, the image sensor(s) 122 may be configured to generate an RGB-IR video signal. In an infrared light only illuminated field of view, the image sensor(s) 122 may generate a monochrome (B/W) video signal. In a field of view illuminated by both IR light and visible light, the image sensor(s) 122 may be configured to generate color information in addition to the monochrome video signal. In various embodiments, the image sensor(s) 122 may be configured to generate a video signal in response to visible and/or infrared (IR) light.

The processor/logic 124 may transform the bitstream into a human viewable content (e.g., video data that may be understandable to an average person regardless of image quality, such as the video frames). For example, the processor 124 may receive pure (e.g., raw) data from the sensor(s) 122 and generate (e.g., encode) video data (e.g., the bitstream) based on the raw data. The capture device 104 may have the memory 126 to store the raw data and/or the processed bitstream. For example, the capture device 104 may implement a frame memory and/or buffer 126 to store (e.g., provide temporary storage and/or cache) one or more of the video frames (e.g., the digital video signal). In some embodiments, the processor/logic 124 may perform analysis and/or correction on the video frames stored in the memory/buffer 126 of the capture device 104.

The sensors 114 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 114 may be configured to detect motion anywhere in the field of view monitored by the camera 100. In various embodiments, the detection of motion may be used as one threshold for activating the capture device 104. In some embodiments, the sensors 114 may be implemented as an internal component of the camera 100. In some embodiments, the sensors 114 may be implemented as a component external to the camera 100. In an example, the sensors 114 may include a passive infrared (PIR) sensor. In another example, the sensors 114 may implement a smart motion sensor. In embodiments implementing the smart motion sensor, the sensors 114 may comprise a low resolution image sensor configured to detect motion and/or persons.

In various embodiments, the sensors 114 may generate a signal (e.g., SENS). The signal SENS may comprise a variety of data (or information) collected by the sensors 114. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 114 may generate (assert) the signal SENS when motion is detected in the field of view monitored by the camera 100. In another example, the sensors 114 may generate (assert) the signal SENS when triggered by audio in the field of view monitored by the camera 100. In still another example, the sensors 114 may be configured to provide directional information with respect to motion and/or sound detected in the field of view. The directional information may also be communicated to the processor/SoC 102 via the signal SENS.

The processor/SoC 102 may be configured to execute computer readable code and/or process information. In various embodiments, the computer readable code may be stored within the processor/SoC 102 (e.g., microcode, firmware, etc.) and/or in the memory 106. In an example, the processor/SoC 102 may be configured to store and execute artificial neural networks (ANNs) implementing computer vision (CV) techniques (e.g., feature detection and extraction, object detection and classification, foreground/background separation, image segmentation, facial detection and recognition, liveness determination, etc.). In an example, the ANNs may be stored (e.g., in a non-volatile computer readable storage medium) as directed acyclic graphs (DAGs) and corresponding weights and/or kernels. The processor/SoC 102 may be configured to receive input from and/or present output to the memory 106. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The processor/SoC 102 may receive the signal VIDEO and the signal SENS. The processor/SoC 102 may generate a video output signal (e.g., VIDOUT) based on the signal VIDEO, the signal SENS, and/or other input. In some embodiments, the signal VIDOUT may be generated based on analysis of the signal VIDEO and/or objects detected in the signal VIDEO. In various embodiments, the processor/SoC 102 may be configured to perform one or more of feature extraction, object detection, object tracking, and object identification. In an example, the processor/SoC 102 may be configured to execute one or more artificial neural network models (e.g., a facial recognition convolutional neural network (CNN), an object detection CNN, an object classification CNN, etc.) stored in the memory 106. In an example, the processor/SoC 102 may determine motion information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data from the signal VIDEO. In one example, the signal VIDOUT may comprise color and/or monochrome video data from the signal VIDEO. In another example, the signal VIDOUT may comprise the monochrome video data from the signal VIDEO with color restored. The video output signal VIDOUT may be presented to the memory 106, the communications module 116, and/or the wireless interface 118.

The memory 106 may store data. The memory 106 may implement various types of memory including, but not limited to, as a cache, flash memory, memory card, random access memory (RAM), dynamic RAM (DRAM) memory, etc. The type and/or size of the memory 106 may be varied according to the design criteria of a particular implementation. The data stored in the memory 106 may correspond to a video file, motion information (e.g., readings from the sensors 114), video fusion parameters, image stabilization parameters, user inputs, and/or metadata information. In an example, the memory 106 may store a database embodying color information and color feature information extracted by the processor/SoC 102 from the signal VIDEO.

The lens(es) 108 (e.g., camera lens) may be directed to provide a view of an environment surrounding the camera 100. The lens(es) 108 may be aimed to capture environmental data (e.g., light). The lens(es) 108 may be wide-angle lenses and/or fish-eye lenses (e.g., lenses capable of capturing a wide field of view). The lens(es) 108 may be configured to capture and/or focus the light for the capture device 104. Generally, the image sensor 122 is located behind the lens(es) 108. Based on the captured light from the lens(es) 108, the capture device 104 may generate a bitstream and/or video data.

The communications module 116 may be configured to implement one or more communications protocols. For example, the communications module 116 and the wireless interface 118 may be configured to implement one or more of, IEEE 802.11, IEEE 802.15, IEEE 802.15.1, IEEE 802.15.2, IEEE 802.15.3, IEEE 802.15.4, IEEE 802.15.5, IEEE 802.20, Bluetooth®, and/or ZigBee. In some embodiments, the wireless interface 118 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera 100 is implemented as a wireless camera, the protocol implemented by the communications module 116 and wireless interface 118 may be a wireless communications protocol. The type of communications protocols implemented by the communications module 116 may be varied according to the design criteria of a particular implementation.

The communications module 116 and/or the wireless interface 118 may be configured to generate a broadcast signal as an output from the camera 100. The broadcast signal may send the video data VIDOUT to external devices. For example, the broadcast signal may be sent to a cloud storage service (e.g., a storage service capable of scaling on demand). In some embodiments, the communications module 116 may not transmit data until the processor/SoC 102 has performed video analytics (e.g., object detection, face detection, object identification, facial recognition, etc.) to determine that an object is in the field of view of the camera 100 and/what the object is.

In some embodiments, the communications module 116 may be configured to generate a manual control signal. The manual control signal may be generated in response to a signal from a user received by the communications module 116. The manual control signal may be configured to activate the processor/SoC 102. The processor/SoC 102 may be activated in response to the manual control signal regardless of the power state of the camera 100.

In some embodiments, the camera 100 may include a battery 120 configured to provide power for the various components of the camera 100. The multi-step approach to activating and/or disabling the capture device 104 based on the output of the motion sensor 114 and/or any other power consuming features of the camera 100 may be implemented to reduce a power consumption of the camera 100 and extend an operational lifetime of the battery 120. The motion sensor 114 may have a very low drain on the battery 120 (e.g., less than 10 W). In an example, the motion sensor 114 may be configured to remain on (e.g., always active) unless disabled in response to feedback from the processor/SoC 102. The video analytics performed by the processor/SoC 102 may have a large drain on the battery 120 (e.g., greater than the motion sensor 114). In an example, the processor/SoC 102 may be in a low-power state (or power-down) until some motion is detected by the motion sensor 114.

The camera 100 may be configured to operate using various power states. For example, in the power-down state (e.g., a sleep state, a low-power state) the motion sensor 114 and the processor/SoC 102 may be on and other components of the camera 100 (e.g., the image capture device 104, the memory 106, the communications module 116, etc.) may be off. In another example, the camera 100 may operate in an intermediate state. In the intermediate state, the image capture device 104 may be on and the memory 106 and/or the communications module 116 may be off. In yet another example, the camera 100 may operate in a power-on (or high power) state. In the power-on state, the motion sensor 114, the processor/SoC 102, the capture device 104, the memory 106, and/or the communications module 116 may be on. The camera 100 may consume some power from the battery 120 in the power-down state (e.g., a relatively small and/or minimal amount of power). The camera 100 may consume more power from the battery 120 in the power-on state. The number of power states and/or the components of the camera 100 that are on while the camera 100 operates in each of the power states may be varied according to the design criteria of a particular implementation.

In some embodiments, the camera 100 may include a keypad, a touch pad (or screen), a doorbell switch, and/or other human interface devices (HIDs) 128. In an example, the sensors 114 may be configured to determine when an object is in proximity to the HIDs 128. In an example where the camera 100 is implemented as part of an access control application, the white light LED 112 may be turned on to provide illumination for identifying a person attempting access, illumination of a lock area, and/or illumination for an access touch pad.

Figure 4:
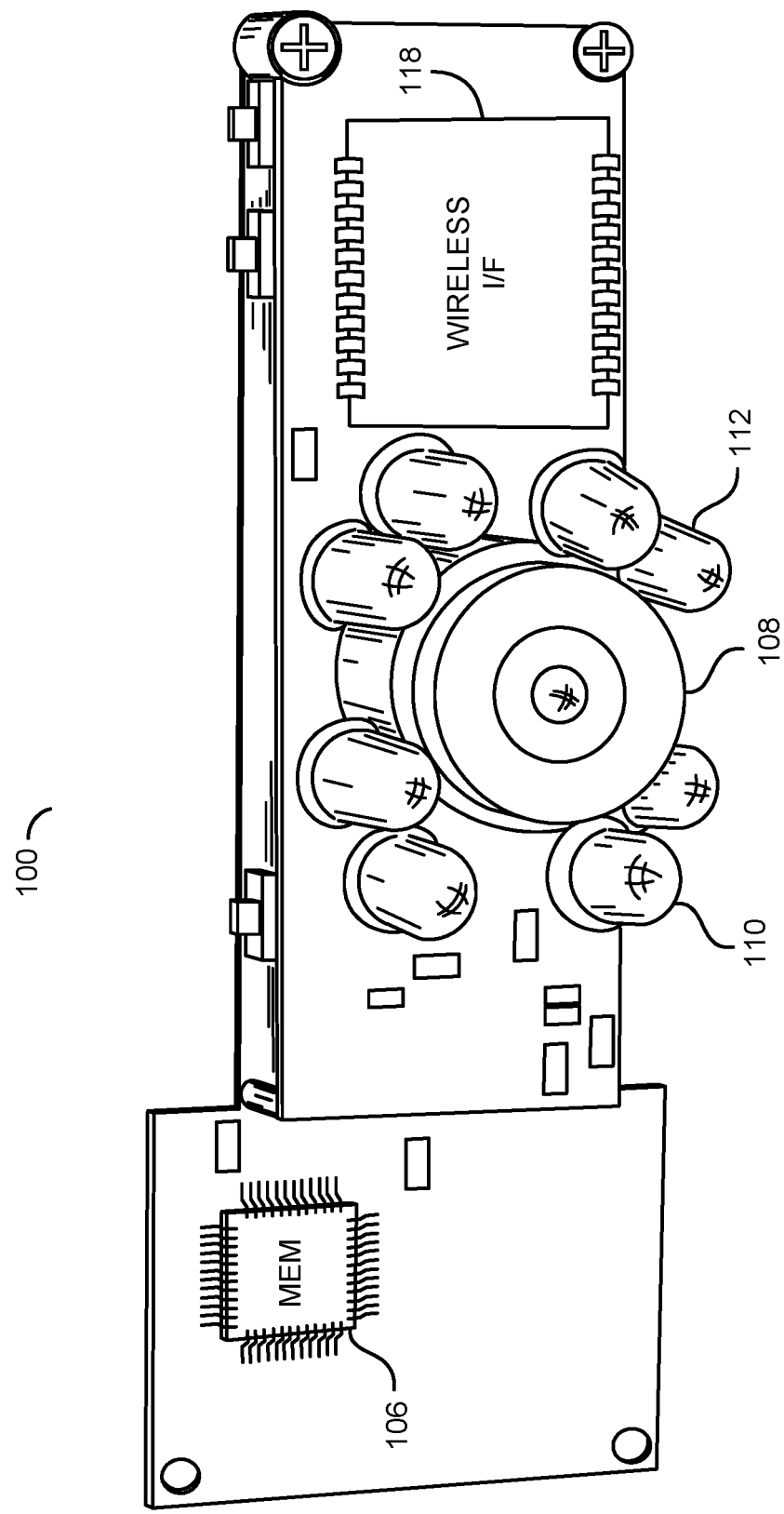
FIG. 4 is a diagram illustrating an example implementation of a camera in accordance with an example embodiment of the invention.

Referring to FIG. 4, a diagram is shown illustrating an example implementation of the camera 100 in accordance with an embodiment of the invention. In various embodiments, the camera 100 may comprise one or more circuit boards. In embodiments implementing more than one circuit board, the printed circuit boards may be mounted together. In an example, a first printed circuit board may include the lens(es) 108, a number of IR LEDs 110, one or more visible (white) light LEDs 112, and the wireless interface circuit (or module) 118, and a second printed circuit board may include the memory circuit (or chip) 106, the processor/SoC 102 and the RGB-IR image sensor 104 (obscured by the first printed circuit board). In one example, the wireless interface 118 may comprise a pre-certified wireless/cellular protocol module.

Figure 5:
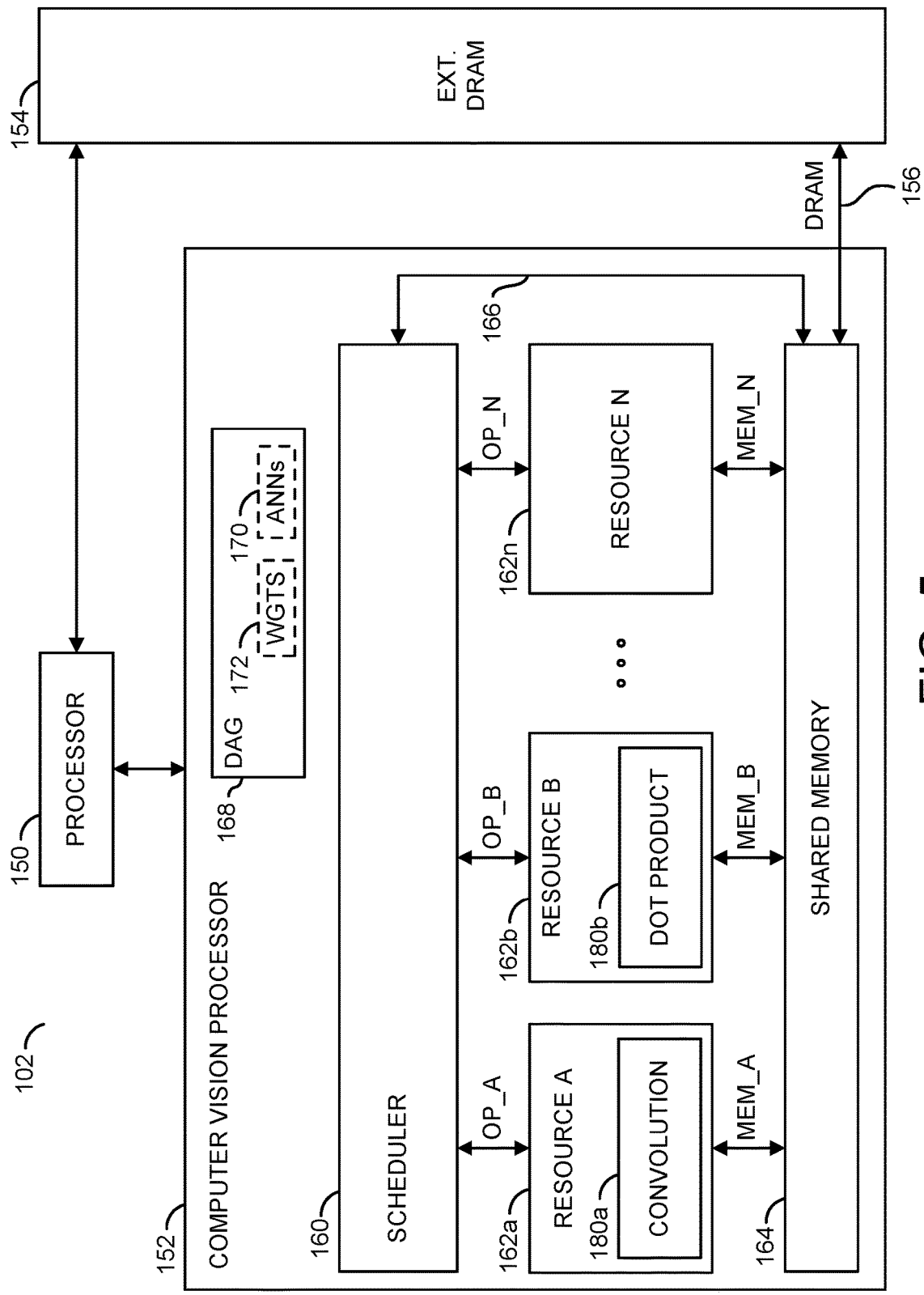
FIG. 5 is a diagram illustrating a processing circuit in which a artificial neural networks may be run to facilitate a color night mode in accordance with example embodiments of the invention.

Referring to FIG. 5, a diagram is shown illustrating a processing circuit in which a color night mode for a smart IP camera in accordance with example embodiments of the invention may be implemented. In an example, the processor/SoC 102 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processor/SoC 102 generally comprises hardware circuitry that is optimized to provide a high performance image processing and computer vision pipeline in minimal area and with minimal power consumption. In an example, various operations used to perform image processing, feature detection/extraction, and/or object detection/classification for computer (or machine) vision may be implemented using hardware modules designed to reduce computational complexity and use resources efficiently.

In an example embodiment, the processor/SoC 102 may comprise a block (or circuit) 150, a block (or circuit) 152, a block (or circuit) 154, and/or a memory bus 156. The circuit 150 may implement a first processor. The circuit 152 may implement a second processor. In an example, the circuit 152 may implement a computer vision processor. In an example, the processor 152 may be an intelligent vision processor. The circuit 154 may implement an external memory (e.g., a memory external to the circuits 150 and 152). In an example, the circuit 154 may be implemented as a dynamic random access memory (DRAM) circuit. The processor/SoC 102 may comprise other components (not shown). The number, type and/or arrangement of the components of the processor/SoC 102 may be varied according to the design criteria of a particular implementation.

The circuit 150 may implement a processor circuit. In some embodiments, the processor circuit 150 may be implemented using a general purpose processor circuit. The processor 150 may be operational to interact with the circuit 152 and the circuit 154 to perform various processing tasks. In an example, the processor 150 may be configured as a controller for the circuit 152. The processor 150 may be configured to execute computer readable instructions. In one example, the computer readable instructions may be stored by the circuit 154. In some embodiments, the computer readable instructions may comprise controller operations. The processor 150 may be configured to communicate with the circuit 152 and/or access results generated by components of the circuit 152. In an example, the processor 150 may be configured to utilize the circuit 152 to perform operations associated with one or more neural network models.

In an example, the processor 150 may be configured to program the circuit 152 with one or more pre-trained artificial neural network models (ANNs) 170 and weights/kernels (WGTS) 172. In various embodiments, the ANNs 170 may be configured (trained) for operation in an edge device. In an example, the processing circuit 102 may be coupled to a sensor (e.g., video camera, etc.) configured to generate a data input. The processing circuit 102 may be configured to generate one or more outputs in response to the data input from the sensor based on one or more inferences made by executing the pre-trained ANNs 170 with the weights/kernels (WGTS) 172. The operations performed by the processor 150 may be varied according to the design criteria of a particular implementation.

In various embodiments, the circuit 154 may implement a dynamic random access memory (DRAM) circuit. The circuit 154 is generally operational to store multidimensional arrays of input data elements and various forms of output data elements. The circuit 154 may exchange the input data elements and the output data elements with the processor 150 and the processor 152.

The processor 152 may implement a computer vision processor circuit. In an example, the circuit 152 may be configured to implement various functionality used for computer vision. The processor 152 is generally operational to perform specific processing tasks as arranged by the processor 150. In various embodiments, all or portions of the processor 152 may be implemented solely in hardware. The processor 152 may directly execute a data flow directed to execution of the ANNs 170, and generated by software (e.g., a directed acyclic graph, etc.) that specifies processing (e.g., computer vision) tasks. In some embodiments, the processor 152 may be a representative example of numerous computer vision processors implemented by the processing circuit 102 and configured to operate together.

In an example, the processor 152 generally comprises a block (or circuit) 160, one or more blocks (or circuits) 162a-162n, a block (or circuit) 164, a path 166, and a block (or circuit) 168. The block 160 may implement a scheduler circuit. The blocks 162a-162n may implement hardware resources (or engines). The block 164 may implement a shared memory circuit. The block 168 may implement a directed acyclic graph (DAG) memory. In an example embodiment, one or more of the circuits 162a-162n may comprise blocks (or circuits) 180a-180n. In the example shown, circuits 180a and 180b are implemented.

In an example, the circuit 180a may implement convolution operations. In another example, the circuit 180b may be configured to provide dot product operations. The convolution and dot product operations may be used to perform computer (or machine) vision tasks (e.g., as part of an object detection process, etc.). In yet another example, one or more of the circuits 162c-162n may comprise blocks (or circuits) 180c-180n (not shown) to provide convolution calculations in multiple dimensions.

In an example, the circuit 152 may be configured to receive directed acyclic graphs (DAGs) from the processor 150. The DAGs received from the processor 150 may be stored in the DAG memory 168. The circuit 152 may be configured to execute a DAG for one of the ANNs 170 using the circuits 160, 162a-162n, and 164.

Multiple signals (e.g., OP_A to OP_N) may be exchanged between the circuit 160 and the respective circuits 162a-162n. Each signal OP_A to OP_N may convey execution operation information and/or yield operation information. Multiple signals (e.g., MEM_A to MEM_N) may be exchanged between the respective circuits 162a-162n and the circuit 164. The signals MEM_A to MEM_N may carry data. A signal (e.g., DRAM) may be exchanged between the circuit 154 and the circuit 164. The signal DRAM may transfer data between the circuits 154 and 160 (e.g., on the memory bus 166).

The circuit 160 may implement a scheduler circuit. The scheduler circuit 160 is generally operational to schedule tasks among the circuits 162a-162n to perform a variety of computer vision related tasks as defined by the processor 150. Individual tasks may be allocated by the scheduler circuit 160 to the circuits 162a-162n. The scheduler circuit 160 may allocate the individual tasks in response to parsing the directed acyclic graphs (DAGs) provided by the processor 150. The scheduler circuit 160 may time multiplex the tasks to the circuits 162a-162n based on the availability of the circuits 162a-162n to perform the work.

Each circuit 162a-162n may implement a processing resource (or hardware engine). The hardware engines 162a-162n are generally operational to perform specific processing tasks. The hardware engines 162a-162n may be implemented to include dedicated hardware circuits that are optimized for high-performance and low power consumption while performing the specific processing tasks. In some configurations, the hardware engines 162a-162n may operate in parallel and independent of each other. In other configurations, the hardware engines 162a-162n may operate collectively among each other to perform allocated tasks.

The hardware engines 162a-162n may be homogenous processing resources (e.g., all circuits 162a-162n may have the same capabilities) or heterogeneous processing resources (e.g., two or more circuits 162a-162n may have different capabilities). The hardware engines 162a-162n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In various embodiments, the hardware engines 162a-162n may be implemented solely as hardware circuits. In some embodiments, the hardware engines 162a-162n may be implemented as generic engines that may be configured through circuit customization and/or software/firmware to operate as special purpose machines (or engines). In some embodiments, the hardware engines 162a-162n may instead be implemented as one or more instances or threads of program code executed on the processor 150 and/or one or more processors 152, including, but not limited to, a vector processor, a central processing unit (CPU), a digital signal processor (DSP), or a graphics processing unit (GPU). In some embodiments, one or more of the hardware engines 162a-162n may be selected for a particular process and/or thread by the scheduler 160. The scheduler 160 may be configured to assign the hardware engines 162a-162n to particular tasks in response to parsing the directed acyclic graphs stored in the DAG memory 168.

The circuit 164 may implement a shared memory circuit. The shared memory 164 may be configured to store data in response to input requests and/or present data in response to output requests (e.g., requests from the processor 150, the DRAM 154, the scheduler circuit 160 and/or the hardware engines 162a-162n). In an example, the shared memory circuit 164 may implement an on-chip memory for the computer vision processor 152. The shared memory 164 is generally operational to store all of or portions of the multidimensional arrays (or vectors) of input data elements and output data elements generated and/or utilized by the hardware engines 162a-162n. The input data elements may be transferred to the shared memory 164 from the DRAM circuit 154 via the memory bus 156. The output data elements may be sent from the shared memory 164 to the DRAM circuit 154 via the memory bus 156.

The path 166 may implement a transfer path internal to the processor 152. The transfer path 166 is generally operational to move data from the scheduler circuit 160 to the shared memory 164. The transfer path 166 may also be operational to move data from the shared memory 164 to the scheduler circuit 160.

The processor 150 is shown communicating with the computer vision processor 152. The processor 150 may be configured as a controller for the computer vision processor 152. In some embodiments, the processor 150 may be configured to transfer instructions to the scheduler 160. For example, the processor 150 may provide one or more directed acyclic graphs to the scheduler 160 via the DAG memory 168. The scheduler 160 may initialize and/or configure the hardware engines 162a-162n in response to parsing the directed acyclic graphs. In some embodiments, the processor 150 may receive status information from the scheduler 160. For example, the scheduler 160 may provide a status information and/or readiness of outputs from the hardware engines 162a-162n to the processor 150 to enable the processor 150 to determine one or more next instructions to execute and/or decisions to make. In some embodiments, the processor 150 may be configured to communicate with the shared memory 164 (e.g., directly or through the scheduler 160, which receives data from the shared memory 164 via the path 166). The processor 150 may be configured to retrieve information from the shared memory 164 to make decisions. The instructions performed by the processor 150 in response to information from the computer vision processor 152 may be varied according to the design criteria of a particular implementation.

Figure 6:
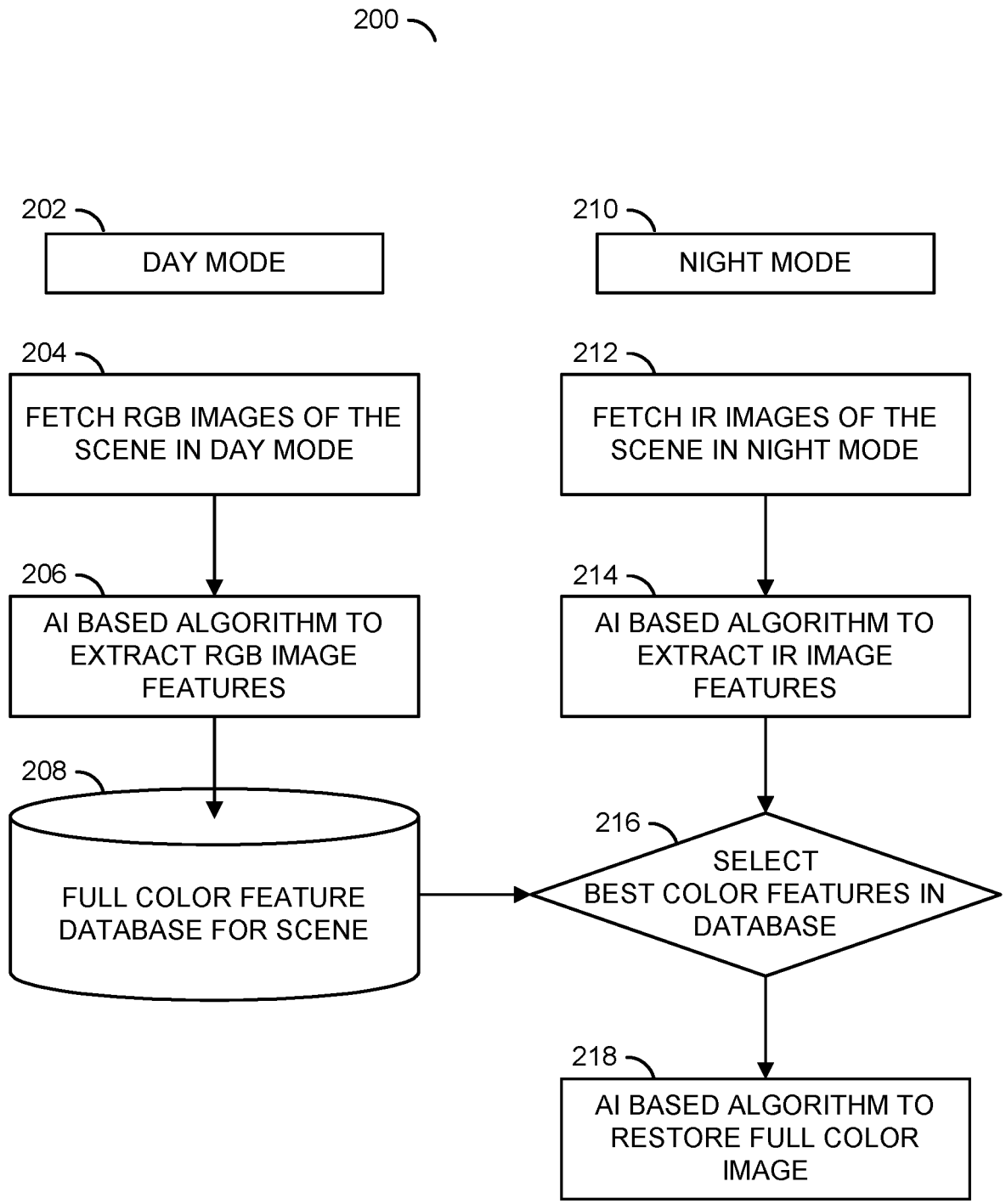
FIG. 6 is a flow diagram illustrating a process implementing a color night mode in accordance with an example embodiment of the invention.

Referring to FIG. 6, a flow diagram of a process 200 is shown illustrating a color night mode in accordance with an example embodiment of the invention that may be implemented in a smart IP camera. In various embodiments, the process (or method) 200 may be utilized to add (restore) color, obtained during daytime operation, to a monochrome infrared image captured during nighttime operation. In an example, a day mode 202 may start in a step 204 where the process 200 may periodically capture color (e.g., RGB, etc.) images. In a step 206, the process 200 may use an artificial intelligence (AI) algorithm to extract full color information about one or more color features in a scene monitored by the smart IP camera. In an example, the AI algorithm may be implemented using a segmentation neural network (e.g., DeepLabv3/FCN, etc.). In a step 208, the process 200 may record the extracted full color information associated with the one or more extracted color features into a database. In an example, the data stored in the database may include, but is not limited to, color (e.g., RGB, YUV, etc.) information (e.g., pixel values) for an entire image, a region of interest (e.g., based on object detection result), or some other predetermined portion of the image. In one example, the database may be stored locally in a non-volatile storage medium (e.g., FLASH memory, SD memory card, etc.). In another example, the database may be stored remotely (e.g., in a dedicated server, in cloud resources, etc.).

In an example, a night mode 210 may start in a step 212 where the process 200 may periodically capture monochrome infrared images. In a step 214, the process 200 may use an artificial intelligence (AI) algorithm to extract features from the monochrome infrared (IR) images. In an example, the AI algorithm may be implemented using a segmentation neural network (e.g., DeepLabv3/FCN, etc.). In a step 216, the process 200 may use an artificial intelligence (AI) algorithm to smartly select full color features in the database that correspond to the extracted features from the monochrome infrared images. In an example, the step 216 may involve an iterative process to find color features that best match the monochrome features based on predefined criteria. In a step 218, the process 200 may use another AI algorithm to restore (e.g., colorize) each IR image back to a full color image using the full color information associated with the color features in the database. In an example, the AI algorithm may be implemented using a fully convolutional neural network (FCN) (e.g., UNet/Pix2Pix, etc.). The restored full color images may be presented by the smart IP camera as an output of the night mode 210.

Figure 7:
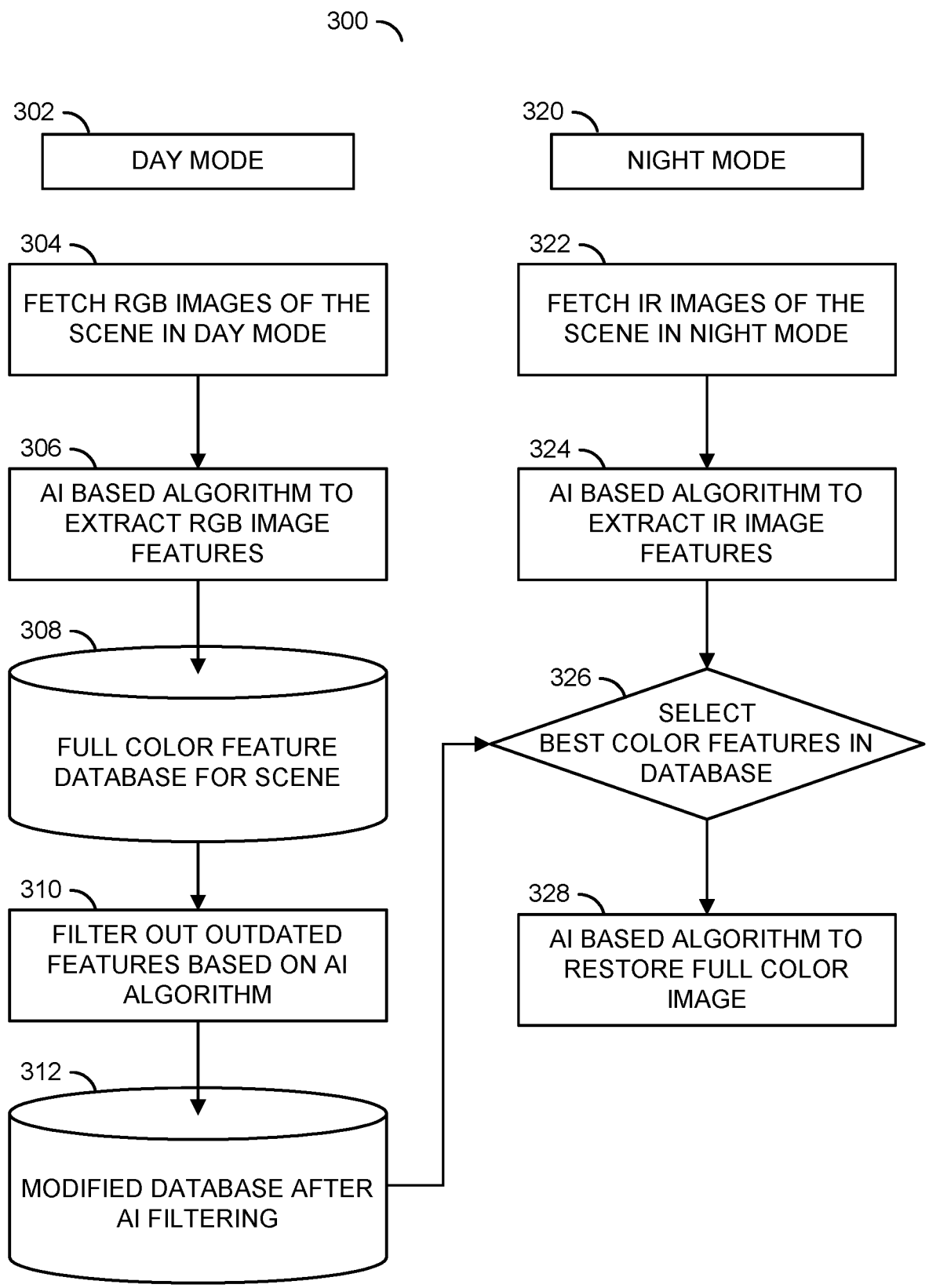
FIG. 7 is a flow diagram illustrating a process implementing an adaptive color night mode in accordance with an example embodiment of the invention.

Referring to FIG. 7, a flow diagram of a process 300 is shown illustrating a color night mode in accordance with another example embodiment of the invention that may be implemented in a smart IP camera. In various embodiments, the process (or method) 300 may be utilized to add color, obtained during daytime operation, to a monochrome infrared image captured during nighttime operation. In an example, a camera mounting position may change. When a camera mounting position changes, an adaptive approach in accordance with an example embodiment of the invention may be implemented to dynamically adjust the smart IP camera to the new mounting position. In an example, a day mode 302 may start in a step 304 where the process 300 may periodically capture color (e.g., RGB, etc.) images. In a step 306, the process 300 may use an artificial intelligence (AI) algorithm to extract full color information about one or more color features in a scene monitored by the smart IP camera. In an example, the AI algorithm may be implemented using a segmentation neural network (e.g., DeepLabv3/FCN, etc.). In a step 308, the process 300 may record the extracted full color information associated with the one or more extracted color features into a database. In an example, the data stored in the database may include, but is not limited to, color (e.g., RGB, YUV, etc.) information (e.g., pixel values) for an entire image, a region of interest (e.g., based on object detection result), or some other predetermined portion of the image. In one example, the database may be stored locally in a non-volatile storage medium (e.g., FLASH memory, SD memory card, etc.). In another example, the database may be stored remotely (e.g., in a dedicated server, in cloud resources, etc.).

In response to the camera mounting position being changed, another AI algorithm may be used in a step 310 to filter out (e.g., remove, tag, etc.) outdated color features in the database. In a step 312, the database may be modified after filtering by the AI algorithm to be adaptive to the scene change resulting from the change of mounting position.

In an example, a night mode 320 may start in a step 322 where the process 300 may periodically capture monochrome infrared images. In a step 324, the process 300 may use an artificial intelligence (AI) algorithm to extract features from the monochrome infrared (IR) images. In an example, the AI algorithm may be implemented using a segmentation neural network (e.g., DeepLabv3/FCN, etc.). In a step 326, the process 300 may use an artificial intelligence (AI) algorithm to smartly select full color features in the modified database that correspond to the extracted features from the monochrome infrared images. In an example, the step 326 may involve an iterative process to find color features that best match the monochrome features based on predefined criteria. In a step 328, the process 300 may use another AI algorithm to restore (e.g., colorize) each IR image back to a full color image using the full color information associated with the color features in the modified database. In an example, the AI algorithm may be implemented using a fully convolutional neural network (FCN) (e.g., UNet/Pix2Pix, etc.). The restored full color images may be presented by the smart IP camera as an output of the night mode 320.

Figure 8:
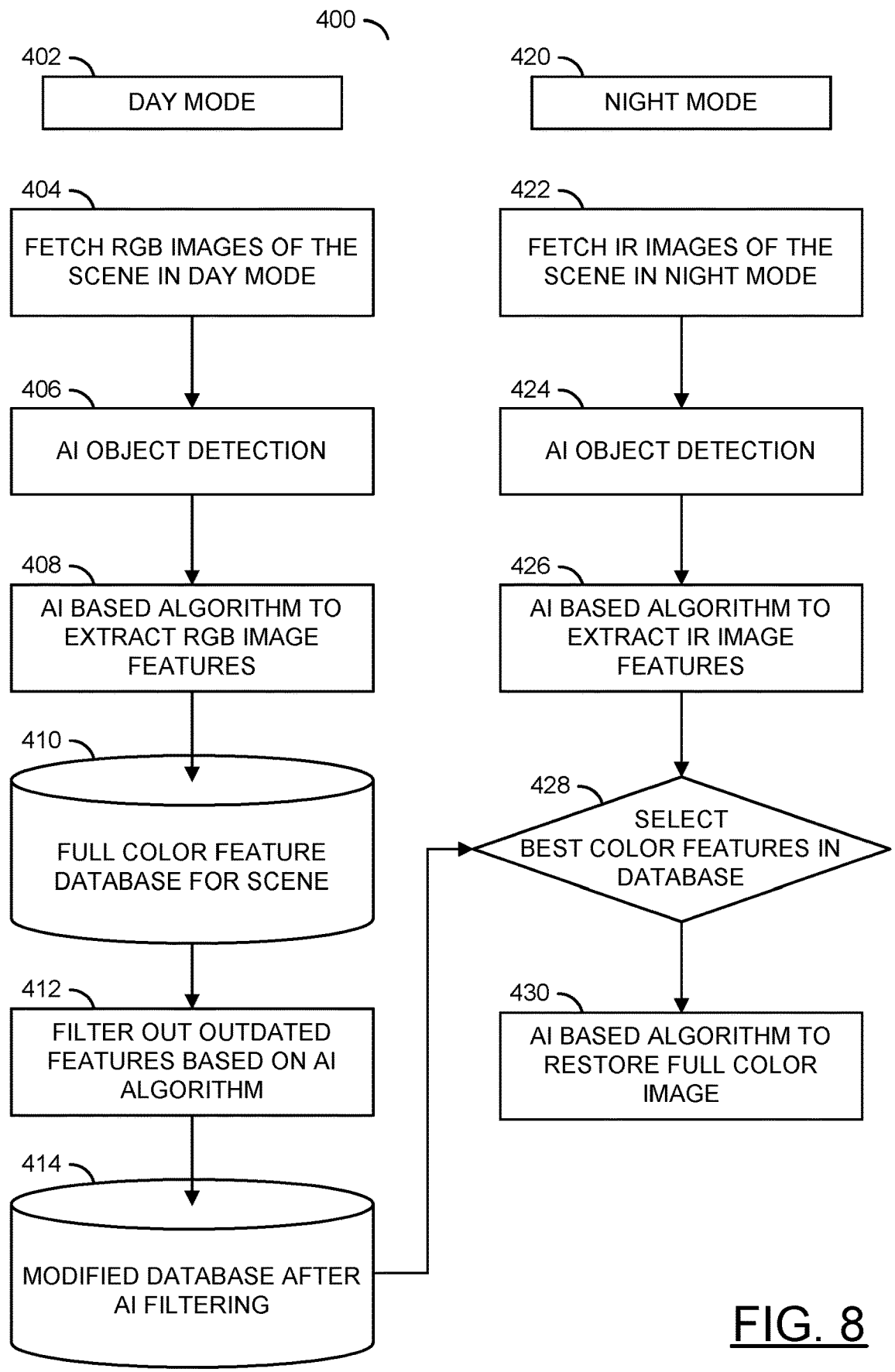
FIG. 8 is a flow diagram illustrating a process implementing an adaptive color night mode in accordance with another example embodiment of the invention.

Referring to FIG. 8, a flow diagram of a process 400 is shown illustrating a color night mode in accordance with another example embodiment of the invention that may be implemented in a smart IP camera. In various embodiments, the process (or method) 400 may be utilized to add color, obtained during daytime operation, to a monochrome infrared image captured during nighttime operation. In some applications, a user may have particular objects of interest and/or objects (e.g., vehicles, people, etc.) may vary (come and go) over time, while the scene may remain otherwise static. In an example, a color night mode in accordance with an example embodiment of the invention may provide an approach to cover such a scenario. In an example, an AI based object detection step may be incorporated with the flows described above in connection with FIGS. 6 and 7.

In an example, a day mode 402 may start in a step 404 where the process 400 may periodically capture color (e.g., RGB, etc.) images. In a step 406, the process 400 may use an artificial intelligence (AI) algorithm to detect objects of interest in the scene viewed by the smart IP camera. In an example, regions of interest (ROIs) with an object class of interest may be generated by a respective object detector(s). In an example, the AI algorithm may be implemented using an object detection neural network (e.g., YOLO/SSD, etc.) to select the ROI images. In a step 408, the process 400 may feed the ROI images into a full color feature extractor using an artificial intelligence (AI) algorithm to extract full color information about the one or more ROIs and/or color features of the objects in the scene monitored by the smart IP camera. In an example, the AI algorithm may be implemented using a segmentation neural network (e.g., DeepLabv3/FCN, etc.). In a step 410, the process 400 may record the extracted full color information associated with the one or more objects and/or extracted color features into a database. In an example, the data stored in the database may include, but is not limited to, color (e.g., RGB, YUV, etc.) information (e.g., pixel values) for an entire image, a region of interest (e.g., based on object detection result), or some other predetermined portion of the image. In one example, the database may be stored locally in a non-volatile storage medium (e.g., FLASH memory, SD memory card, etc.). In another example, the database may be stored remotely (e.g., in a dedicated server, in cloud resources, etc.).

In an example, the process 400 may also be adaptive to changes in the objects found in an image and/or the mounting position of the smart IP camera. In response to the objects changing and/or the camera mounting position being changed, another AI algorithm may be used in a step 412 to filter out (e.g., remove, tag, etc.) outdated color features in the database. In a step 414, the database may be modified after filtering by the AI algorithm to be adaptive to changes in the objects and/or the scene.

In an example, a night mode 420 may start in a step 422 where the process 400 may periodically capture monochrome infrared images. In a step 424, the process 400 may use an artificial intelligence (AI) algorithm to detect objects of interest in the night or low light scene viewed by the smart IP camera. In an example, each region of interest (ROI) with an object class of interest may be generated by a respective object detector. In an example, the AI algorithm may be implemented using an object detection neural network (e.g., YOLO/SSD, etc.) to select the ROI images. In a step 426, the process 400 may feed the ROI images into a feature extractor using an artificial intelligence (AI) algorithm to extract information about one or more features of the objects in the monochrome infrared (IR) images of the scene monitored by the smart IP camera. In an example, the AI algorithm may be implemented using a segmentation neural network (e.g., DeepLabv3/FCN, etc.). In a step 428, the process 400 may use an artificial intelligence (AI) algorithm to smartly select full color features in the modified database that correspond to the extracted objects and/or features from the monochrome infrared images. In a step 430, the process 400 may use another AI algorithm to restore (e.g., colorize) each IR image back to a full color image using the full color information associated with the objects and/or color features in the modified database. In an example, the AI algorithm may be implemented using a fully convolutional neural network (FCN) (e.g., UNet/Pix2Pix, etc.). The restored full color images may be presented by the smart IP camera as an output of the night mode 420.

Referring to FIG. 9, a diagram of a camera system 900 is shown illustrating an example implementation of a computer vision system in which a full color night mode in accordance with example embodiments of the invention may be implemented. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the circuits and processes described above in connection with FIG. 1 through FIG. 8.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be implemented as one or more image sensors. In one example, the circuit 908 may be implemented as an RGB sensor and an IR sensor. In another example, the circuit 908 may be implemented as and RGB-IR sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera system 900. The lens assembly 906 may capture and/or focus light for the image sensor(s) 908. The lens assembly 906 may implement an optical lens or lenses. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera system 900.

The image sensor(s) 908 may receive light from the lens assembly 906. The image sensor(s) 908 may be configured to transform the received focused light into digital data (e.g., bitstreams). In some embodiments, the image sensor(s) 908 may perform an analog to digital conversion. For example, the image sensor(s) 908 may perform a photoelectric conversion of the focused light received from the lens assembly 906. The image sensor(s) 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930a-930n, a number of blocks (or circuits) 932a-932n, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, a block (or circuit) 952, and/or a block (or circuit) 954. The number of circuits 930a-930n may be processor circuits. In various embodiments, the circuits 930a-930n may include one or more embedded processors (e.g., ARM, etc.). The circuits 932a-932n may implement a number of computer vision related processor circuits. In an example, one or more of the circuits 932a-932n may implement various computer vision related applications. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 916, the non-volatile memory 918, and the removable media 920. One or more of the DRAM 916, the non-volatile memory 918 and/or the removable media 920 may store computer readable instructions. The computer readable instructions may be read and executed by the processors 930a-930n. In response to the computer readable instructions, the processors 930a-930n may be operational to operate as controllers for the processors 932a-932n. For example, the resources of the processors 932a-932n may be configured to efficiently perform various specific operations in hardware and the processors 930a-930n may be configured to make decisions about how to handle input/output to/from the various resources of the processors 932.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, the DAG memory 168 may be implemented in the local memory system 938. The circuit 940 may implement a sensor input (or interface). The circuit 942 may implement one or more control interfaces including but not limited to an inter device communication (IDC) interface, an inter integrated circuit (I2C) interface, a serial peripheral interface (SPI), and a pulse width modulation (PWM) interface. The circuit 944 may implement an audio interface (e.g., an I2S interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuit 954 may be a security module. The circuits 930 through 954 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the processors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I2S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering. The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee, Z-Wave, LoRa, Institute of Electrical and Electronics Engineering (IEEE) 802.11a/b/g/n/ac (WiFi), IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, 5G, LTE M, NB-IoT, SMS, etc. The communication module 952 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The security module 954 may include a suite of advanced security features to implement advanced on-device physical security, including OTP, secure boot, TrustZone, and I/O visualization, and DRAM scrambling. In an example, the security module 958 may include a true random number generator. In an example, the security module 954 may be used for DRAM communication encryption on the processor/camera circuit 902.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE M, NB-IoT, etc. The processor/camera circuit 902 may also include support for communication using one or more of the universal serial bus protocols (e.g., USB 1.0, 2.0, 3.0, etc.).

The functions performed by and structures illustrated in the diagrams of FIGS. 1 to 9 may be designed, modeled, emulated, and/or simulated using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP), distributed computer resources, and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a camera configured to capture color images of a monitored field of view in response to visible light during daytime operation and monochrome infrared images of the monitored field of view in response to infrared light during nighttime operation; and
   a processor circuit configured to extract color information of one or more color features of one or more of objects and backgrounds from the color images of said monitored field of view captured during daytime operation and add color from the color features to corresponding monochrome features of one or more corresponding objects and backgrounds detected in the monochrome infrared images of said monitored field of view captured during nighttime operation, wherein said processor circuit (a) stores and executes a first artificial neural network to extract said color information about said one or more color features of said one or more objects and backgrounds from said color images of said monitored field of view captured during a daytime operating mode and stores the color information about the one or more color features of said one or more objects and backgrounds from the color images in a database during the daytime operating mode, (b) stores and executes a second artificial neural network to extract one or more extracted features of one or more of objects and backgrounds from said monochrome infrared images of said monitored field of view captured during a nighttime operating mode, (c) selects one or more color features in the database associated with one or more of the objects and backgrounds from the color images that correspond to the one or more extracted features of one or more of the objects and backgrounds from the monochrome infrared images during the nighttime operating mode, and (d) stores and executes a third artificial neural network to colorize each monochrome infrared image to a full color image by adding the color information associated with the color features selected from the database to the one or more extracted features of the one or more of the objects and backgrounds of the monochrome infrared images corresponding to the one or more of the objects and backgrounds from the color images associated with the color features.

2. The apparatus according to claim 1, wherein said camera comprises an RGB image sensor and an IR image sensor.

3. The apparatus according to claim 1, wherein said camera comprises an RGB-IR image sensor.

4. The apparatus according to claim 1, wherein said color information about said one or more color features extracted from the color images stored in the database comprises pixel values for one or more of an entire image, a region of interest, an object, a background region, or a predetermined portion of an image.

5. The apparatus according to claim 1, wherein said processor circuit is further configured to dynamically adjust one or more stored color features stored in the database to adapt to a position of the camera changing.

6. The apparatus according to claim 1, wherein said processor circuit is further configured to dynamically adjust one or more objects stored in the database to adapt to an object in the monitored field of view of the camera changing.

7. The apparatus according to claim 1, wherein the database is stored locally in a memory connected to said processor circuit.

8. The apparatus according to claim 1, wherein the database is stored remotely in a cloud resource.

9. The apparatus according to claim 1, wherein said camera and said processor circuit are part of at least one of a surveillance system, a security system, and an access control system.

10. A method for implementing a color night mode in a smart IP camera comprising:
capturing color images of a monitored field of view in response to visible light during daytime operation using a camera;
capturing monochrome infrared images of the monitored field of view in response to infrared light during nighttime operation using the camera;
extracting color information of one or more color features of one or more of objects and backgrounds from the color images of said monitored field of view captured during the daytime operation using a processor circuit to store and execute a first artificial neural network to extract the color information about the one or more color features of the one or more of objects and backgrounds from said color images and store the color information about the one or more color features in a database during a daytime operating mode;
extracting one or more monochrome features of one or more of objects and backgrounds from said monochrome infrared images of the monitored field of view captured during the nighttime operation using the processor circuit to store and execute a second artificial neural network to extract one or more extracted monochrome features of one or more of objects and backgrounds from said monochrome infrared images and select one or more color features in the database associated with one or more of the objects and backgrounds from the color images that correspond to the one or more extracted monochrome features of the objects and backgrounds from the monochrome infrared images during a nighttime operating mode; and
adding color from the color features extracted during the daytime operation to corresponding monochrome features detected in the monochrome infrared images of the monitored field of view captured during the nighttime operation using the processor circuit to store and execute a third artificial neural network to colorize each monochrome infrared image back to a full color image by adding the color information associated with the color features selected from the database to the one or more extracted monochrome features of the one or more of the objects and backgrounds of the monochrome infrared images corresponding to the one or more of the objects and backgrounds from the color images associated with the color features selected from the database.

11. The method according to claim 10, wherein:
the color information about the one or more color features extracted from the color images stored in the database comprises pixel values for one or more of an entire image, a region of interest, an object, a background region, or a predetermined portion of an image.

12. The method according to claim 11, further comprising:
dynamically adjusting one or more color features stored in the database to adapt to a mounting position of the camera changing.

13. The method according to claim 10, further comprising:
capturing the color images using an RGB image sensor; and
capturing the monochrome infrared images using an IR image sensor.

14. The method according to claim 10, further comprising:
capturing the color images and the monochrome infrared images using an RGB-IR image sensor.

15. The method according to claim 11, wherein extracting color features from the color images comprises using the processor circuit to apply a segmentation neural network model to the captured color images.

16. The method according to claim 11, wherein extracting color features from the color images further comprises using the processor circuit to apply an object detection neural network model to the captured color images to select one or more regions of interest.

17. The method according to claim 11, wherein adding color from the color features stored in the database to corresponding monochrome features detected in the monochrome infrared images comprises using the processor circuit to apply a fully convolutional neural network model to the captured monochrome infrared images.

18. The method according to claim 17, wherein the processor circuit applies a fully convolutional neural network model trained with monochrome images and color images to the captured monochrome infrared images.

19. The apparatus according to claim 1, wherein said first artificial neural network comprises a first segmentation neural network, said second artificial neural network comprises a second segmentation neural network, and said third artificial neural network comprises a fully convolutional neural network.

20. The apparatus according to claim 19, wherein the third artificial neural network comprises a fully convolutional neural network model trained with monochrome images and color images.

* * * * *